United States Patent [19]

Lovendusky

[11] 3,748,442

[45] July 24, 1973

[54] CARD READER TRANSPORT DEVICE

[75] Inventor: Charles Michael Lovendusky, Enola, Pa.

[73] Assignee: AMP Incorporated, Harrisburg, Pa.

[22] Filed: Feb. 11, 1972

[21] Appl. No.: 225,630

Related U.S. Application Data

[63] Continuation of Ser. No. 34,782, May 5, 1970.

[52] U.S. Cl. .............................. 235/61.11 D, 271/51

[51] Int. Cl. .............................................. G06k 13/05

[58] Field of Search ............... 235/61.11 D, 61.11 J; 271/51

[56] References Cited

UNITED STATES PATENTS

| | | | |
|---|---|---|---|
| 2,677,200 | 5/1954 | MacChesney | 235/61.11 D |
| 3,296,605 | 1/1967 | Raddin et al. | 235/61.11 D |
| 3,073,590 | 1/1963 | Romeo et al. | 271/51 |

*Primary Examiner*—Maynard R. Wilbur
*Assistant Examiner*—Joseph M. Thesz, Jr.
*Attorney*—William J. Keating

[57] ABSTRACT

The disclosure relates to a transport mechanism for use with code cards such as credit cards and particularly for use with magnetically coded credit cards wherein a card is accepted into the device only in properly polarized manner due to embossing on the card or the like, entry of the card into the mechanism operating a switch which actuates circuitry capable of either admitting the card directly or waiting for an admit signal to drive the card into the card reader and past a read head whereupon the coded card is read. The coded card is propelled through the reader by means of a drive wheel system comprising four axle-wheel-sprocket assemblies. The assembly comprises a first drive wheel on a first axle which drives the card from the rest position at the card detection switch and which expels the card from the reader after a reading has taken place. The second and fourth axles each include a pair of wheels thereon and are spring loaded to aid the card in tracking flatly and without skew past the read head. The third axle is positioned beneath the read head and comprises a single wheel for applying pressure to the coded card for reading purpose as well as providing a third suspension point to keep the card in a level state when passing under the read head. The coded card is thereby supported at at least three points and a maximum of five points whereby even badly warped cards can be properly processed and accurately read.

9 Claims, 11 Drawing Figures

Inventor
CHARLES MICHAEL LOVENDUSKY
By: Jay M Cantor

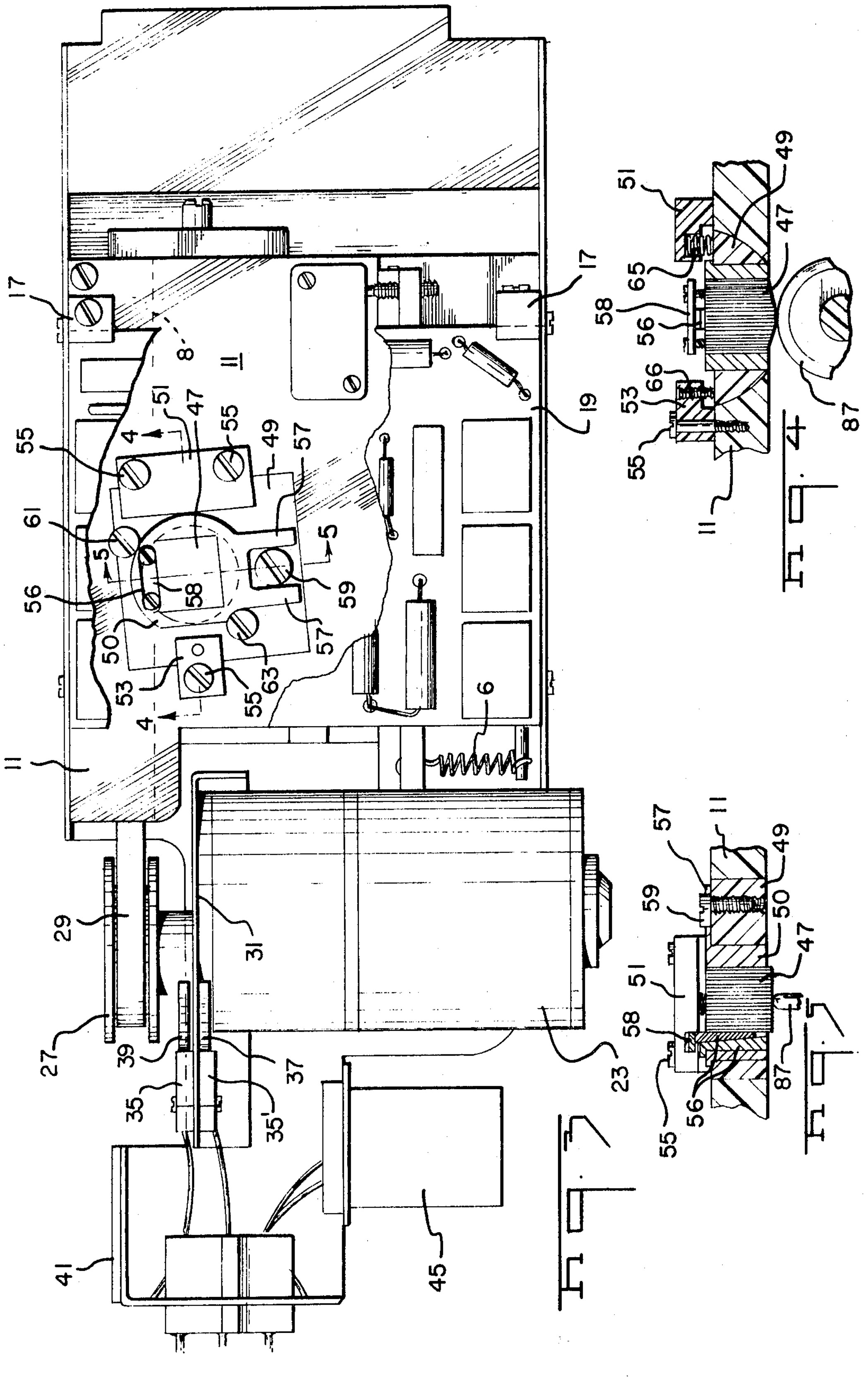

PATENTED JUL 24 1973

3,748,442

SHEET 3 OF 5

CARD READER TRANSPORT DEVICE

This is a continuation of application, Ser. No. 34,782, filed May 5, 1970.

This invention relates to a magnetic card reader transport mechanism, and, more particularly, to a card reader transport mechanism for feeding and returning a coded card to and from a reading station while maintaining a constant speed drive, preventing skew of the card being fed and supporting the card to be read at all points to provide a flattening action to the card whereby badly mutilated cards can be accurately read by the card reader.

Coded cards for credit transactions have become wide spread. The coded cards usually utilized in credit transactions include embossed lettering and embossed coded segments for application to invoices and the like. The number of coded elements which can be placed on an embossed card is small per unit of area relative to magnetic coding. It is therefore being found desirable to utilize embossed cards or the like having a coded strip thereon of magnetic material whereby coded information can be relatively compactly positioned on the magnetic strip. Magnetically coded cards also have the advantage that the coded information thereon is not readily ascertainable without the use of reading devices. The reading of the coded information on the magnetic strip must be accurate in order to provide proper information to external devices or the like of the information on said card. Problems can arise either from mutilated cards or from skew of the card during reading thereof or due to nonsynchronous passage of the card past a reading head.

In accordance with the present invention, there is provided a card reader for reading magnetically coded cards wherein the problems above mentioned are overcome. Briefly, the card reader in accordance with the present invention provides an input bezel at the card insertion point to provide proper orientation of the coded card upon insertion. The card reader also includes a plurality of axles, the first axle including a wheel thereon for placing the card into proper position into the read area. The card reader further includes three additional axles, the second and fourth axles operating with a pair of wheels thereon, whereby the card will track correctly and prevent skew due to the application of at least two and up to four rotating surfaces thereto. Between the second and fourth axle is a third axle having a wheel positioned between the wheels of the second and fourth axle, the wheel on the third axle being positioned below the reading head to position the card accurately beneath the reading head during the reading operation. The third axle, in conjunction with the second and fourth axles applies at least three and sometimes five surfaces to the card. Each of the axles is individually spring loaded to provide an upward force to the card upon reading thereof into the reader to provide a flattening action to the card and substantially reduce errors caused due to card mutilation and due to skew of the card during feeding.

It is therefore an object of this invention to provide a card reader for reading coded cards and particularly coded magnetic coded cards capable of easy card entry and removal.

It is a further object of this invention to provide a card reader capable of feeding coded cards therein without providing a skewing action to the card.

It is a further object of this invention to provide a card reader for reading coded cards which provides flattening force to the card to reduce errors due to card mutilation.

The above objects and still further objects of the invention will immediately become apparent to those skilled in the art after consideration of the following preferred embodiment thereof, which is provided by way of example and not by way of limitation wherein:

FIG. 3 is a top view of the card reader transort mechanism with the block containing the magnetic reading head shown in part;

FIG. 4 is a view taken along the line 4—4 of FIG. 3;

FIG. 5 is a view taken along the line 5—5 of FIG. 3;

Figures 1, 2:
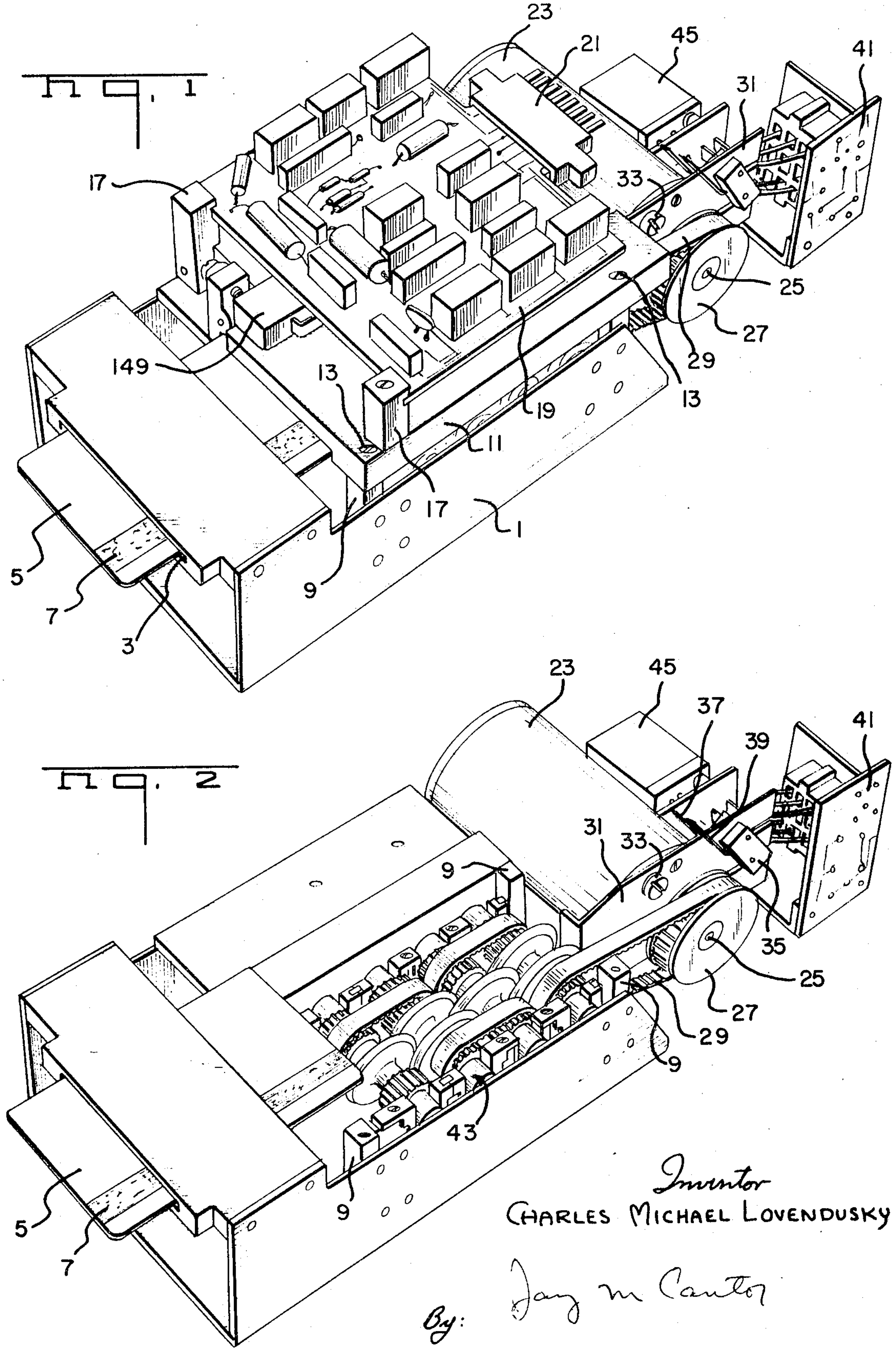
FIG. 1 is a perspective view of a card reader transport mechanism in accordance with the present invention with the top housing removed.
FIG. 2 is a perspective view of a card reader transport mechanism in accordance with the present invention with the printed circuit board and the block carrying the magnetic reading head and card detection switch, if used, removed.

Referring first to FIG. 1, there is shown a magnetic card reader in accordance with the present invention with the top portion of the housing removed. The card reader includes a bottom housing portion 1 having a slot or bezel 3 positioned in one end wall thereof for receiving a credit card 5 having a magnetic strip 7 thereon for receiving and/or storing magnetic coded information thereon. A plurality of posts 9 is secured to the housing member 1 for supporting a block 11 by means of screw members 13. A magnetic reading head 47 (FIG. 3) and a microswitch 149 are positioned on the block 11. The operation of these elements will be explained in detail hereinbelow.

A plurality of supports 17 is secured to the block 11 and support a printed circuit board 19 thereon having electronic components of desired configuration. The printed circuit board terminates in an electrical connector 21 for connection to an external device. Also secured to the housing portion 1 is a motor 23, better shown in FIGS. 2 and 3 having a shaft 25 to which is attached a toothed wheel 27 for driving a belt 29 having grooves therein. The motor is secured to the housing 1 by means of a bracket 31 and a screw member 33. Also secured to the bracket 31 is a switch 35 having contact members 37 and 39, the switch member 35 being connected to a printed circuit 41 for controlling motor 23 and for providing external information signals, if desired.

The belt 29 drives a gearing system 43 which will be described in more detail hereinbelow. The motor 23 is controlled through the printed circuit board 41 by means of a motor controlling element 45 (FIG. 3)

which can act to start, stop or reverse the motor. With reference to FIG. 3, there is shown in partial cut away view the support 11 onto which is positioned the magnetic reading head 47. The magnetic head 47 is positioned in its own housing secured to the support 11 and is readily positioned as will be explained hereinbelow. Referring now to FIGS. 3 to 5, it can be seen that the magnetic head 47 is positioned in a holding member 50, the holding member 50 being secured to support 49 by means of members 61 and 63. Support 49 is held in position by the spring 65 and set screw 66 which is secured in member 53 and pushes on support 49. The member 50 has a pair of flange portions 57 between which an eccentric screw 59 is positioned. Rotation of the eccentric screw member 59 will cause rotation of the support 50 due to the eccentricity. The magnetic head 47 is locked in the member 50 by a pair of wedges 56 which are retained by plate 58. This action will always provide intimate contact between the magnetic head and a card being read without causing damage to the head member or the card. A spring member 6 (FIG. 4) applies a counter clockwise force on the arm 151 to keep the card 5 against the guide edge 8 of the support 11.

Figure 6:
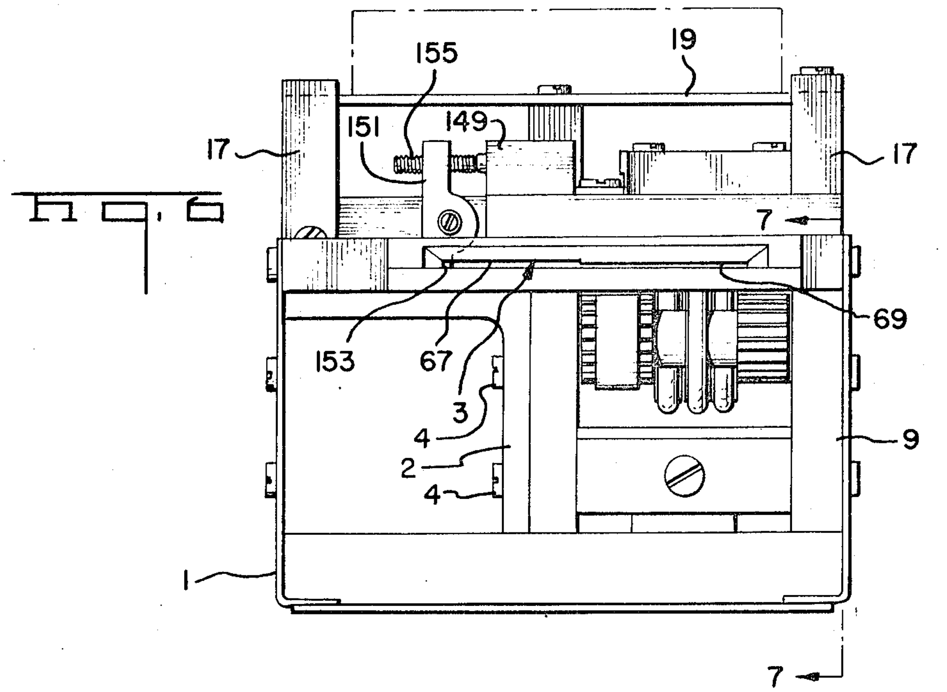
FIG. 6 is an end view taken along the card entry end of the card reader in accordance with the present invention.

Referring to FIG. 6, there is shown the microswitch 149 on the support 11. The microswitch is actuated by a rotatable member 151 having a portion 153 extending into the slot 3. A threaded member 155 is positioned in the rotatable member 151 for actuation of the microswitch 149. Entry of a card into the slot 3 moves the portion 153 in a clockwise direction to rotate the threaded member 155 to actuate the microswitch. The threaded member 155 can be adjusted by rotation thereof.

Referring again to FIG. 6, there is shown the card feeding end of the card reader. The slot 3 includes an enlarged portion 67 and a thinner portion 69, the arrangement being such that the embossed regions of a card cannot pass into the region 69 but only into the region 67, thereby insuring that the coded magnetic strip is properly positioned with the card reader.

The gearing and wheel arrangement to be discussed in detail hereinbelow, including the shafts and arms thereof are held in place by means of the side plate of the lower housing member 1 and the wall member 2 which is secured to the housing member 1 at post 9. Screw members 4 in the wall member 2 and side plate are secured to said wall member and side plate in contact with said gear assembly.

Figures 7, 8:
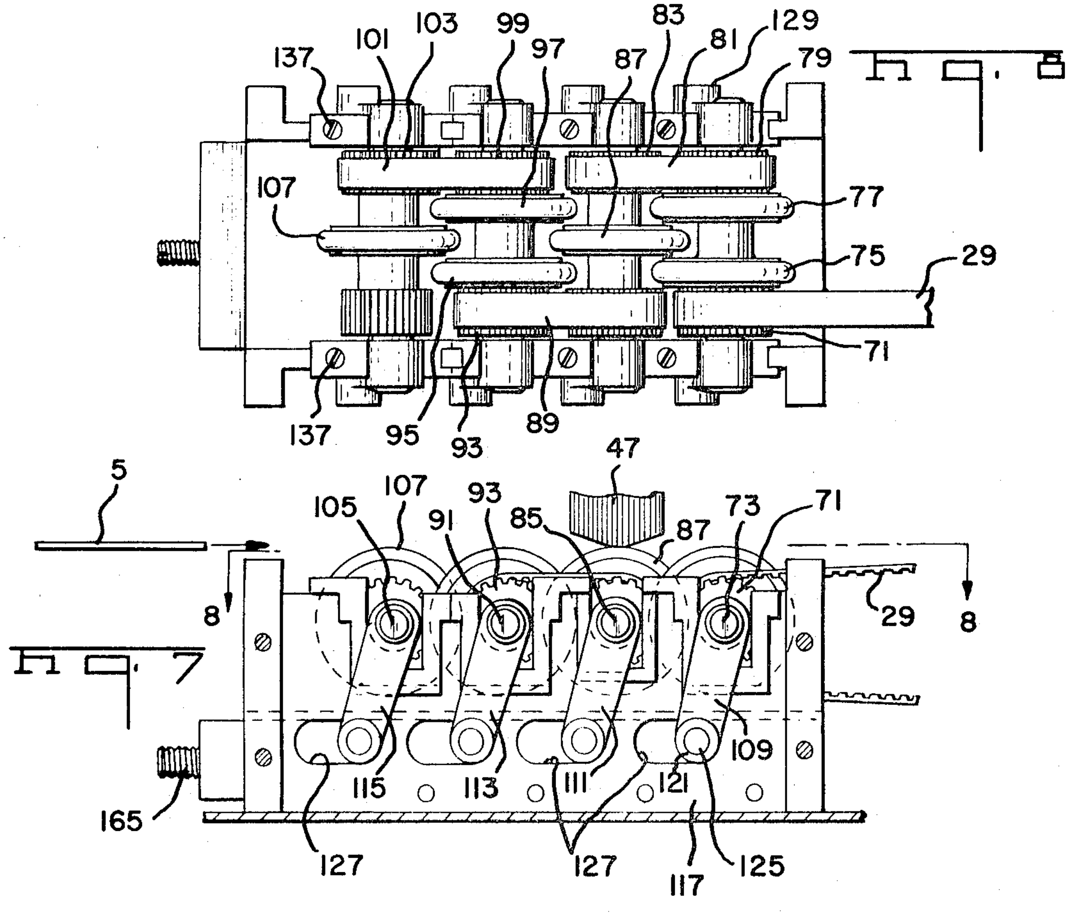
FIG. 7 is a view taken along the line 7—7 of FIG. 6.
FIG. 8 is a view taken along the line 8—8 of FIG. 7.

Referring now to FIGS. 2, 7 and 8 in particular, there is shown the gearing and wheel arrangement for entering and releasing a coded card to be read. Operation of the motor 23 drives the belt 29 which drives the gear 71. Rotation of the gear 71 operates the axle 73 to cause rotation of the wheels 75 and 77. Rotation of the axle 73 also rotates a gear 79 which drives a belt 81 coupled to gear 83 on axle 85 to drive a wheel 87. Rotation of axle 85 drives the belt 89 which drives the axle 91 via gear 93. Rotation of axle 91 drives the wheels 95 and 97 and causes rotation of the gear 99 to drive the belt 101. This causes the gear 103 to rotate and drive its associated axle 105 and the associated wheel 107.

Figure 9:
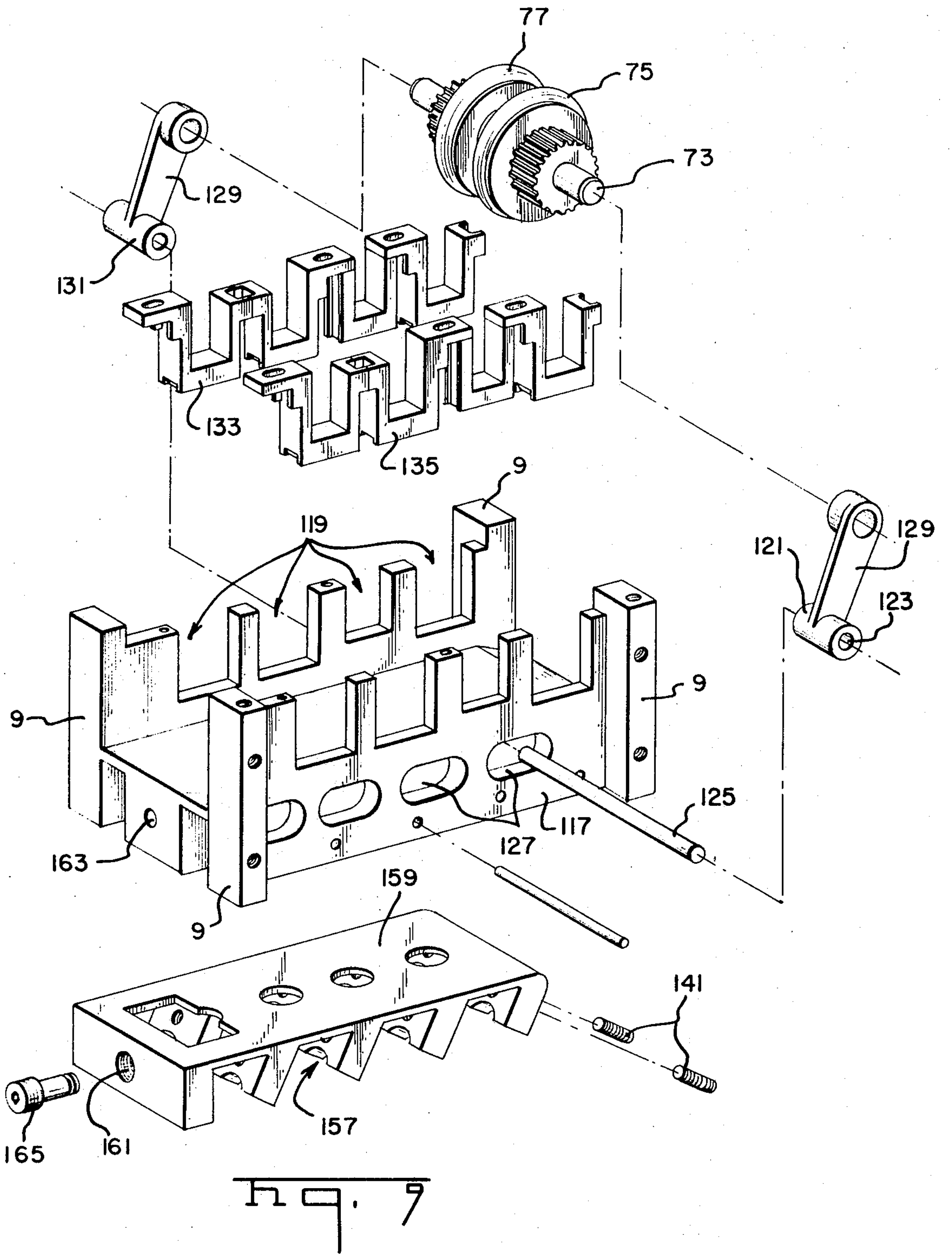
FIG. 9 is an exploded view of the mechanism of FIG. 7.

With reference now more specifically to FIGS. 7 through 11, each of the axles 73, 85, 91 and 105 is positioned through an arm member on each side thereof 109, 111, 113, and 115 respectively, it being understood that equivalent arms are positioned at the opposite side of each of said axles as shown in FIGS. 8 and 9. The axles are supported in a plurality of recesses in a support block 117 which includes the supports 9 as best shown in FIG. 9. The support block 117 has a plurality of grooves 119 at each side thereof extending inwardly. Notched members 133 and 135 conform to the contour of the grooves 119 and are positioned thereon as shown in FIGS. 7 and 8. The members 133 and 135 are secured to the housing member 117 by means of screws 137 (FIG. 8). Axle 73 is shown by way of example in FIG. 9. The axle 73 rotates in arm 129 and the arm includes an inwardly extending extension 121 having an aperture 123 therethrough for receiving a rod 125. The rod 125 extends through an aperture 127 in the housing 117, there being one such aperture 127 associated with each of said arms. The axle 73 will rotate at its other end in arm 129, the flange portion 131 thereof being positioned in the aperture similar to aperture 121 at the other end of the support member 117.

A bottom plate 157 (FIG. 9) having a top surface 159 is positioned in the housing 117 and rests on rods 125. Rotation of the threaded member 165 (FIG. 7) will force said member 157 to move relative to said housing 117 to place a bias on arms 109, 111, 113 and 115 as will be explained in more detail hereinbelow. A pair of set screws 141, two in each leg 143, will bias the rod 125 and thereby the associated arm 109, 111, 113 and 115.

Figure 10:
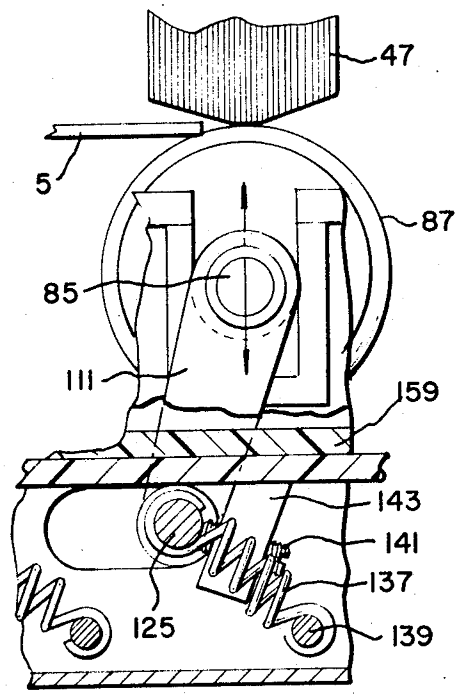
FIG. 10 is an enlarged view showing the linkages of FIG. 7 in greater detail and in the upwardly biased position.
Figure 11:
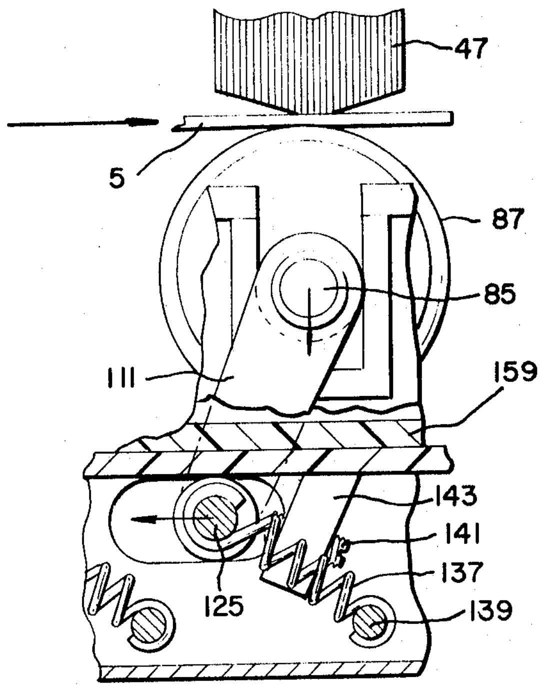
FIG. 11 is a view the same as FIG. 10 but with the arm in a slightly downwardly biased position due to entry of a card therein.

Referring now to FIGS. 10 and 11 there is shown an enlarged view the wheel 87 of FIG. 8 with a card 5 and reading head 47. The description of the operation will be the same for each of the arms 109, 111, 113 and 115. The arm 111 has a flange portion corresponding to the portion 121 of the arm 109 which rests in the aperture 127. As shown in FIG. 10, a spring member 137 is secured to the housing 117 by means of the finger 139 and is also secured to the shaft 125 to normally bias the arm 111 to the right as shown in FIG. 10. In FIG. 10 it will also be noted that the card 5 has not entered between the wheel 87 and the reading head 47 whereby the wheel 87 is removed from reading head 47 by a predetermined distance. As the card 5 enters between the wheel 87 and the reading head 47, the wheel 87 will be pushed downwardly as shown in FIG. 11 and force the arm 111 to rotate in a clockwise direction against the bias of the spring 137, thereby always providing an upward force against the card to the point of contact with the reading head 47. The maximum rightward travel of the shaft 125 depends upon the screw member 141 which is positioned in the flange 14 of the member 157 secured to the housing 117. Rotation of the screw 141 will adjust the normal rightward position of the shaft 125, thereby determining the maximum upward travel of the wheel 87. All of the shafts 125 are simultaneously biased by operation of threaded jack screw 165 which moves member 157 relative to housing 117 to adjust the rest postion of the flanges 143.

It can be seen from the above that there is provided a card reader wherein uniform travel of the card is provided with a maximum of flatness and a minimum of skew, the card being supported directly beneath point of reading to insure maximum reliability at the reading head.

Though the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A card reader and transport assembly comprising: read head means for detecting information stored on said card;

guide means for insuring that said card is properly oriented with respect to said read head means;

transport means for moving said card with respect to said read head means, said transport means including card engaging means for biasing at least a portion of said card into engagement with said read head means, said card engaging means including a plurality of rotatable card engaging members spaced along the direction of movement of said card, all of said rotatable card engaging members adapted to engage only a surface of said card facing away from said read head means;

rotatable means for simultaneously adjusting the biasing force exerted by all of said rotatable card engaging members in said rotatable card engaging means; and, adjusting means associated with each of said rotatable card engaging members for individually adjusting the biasing force exerted by each of said rotatable card engaging members.

2. A card reader and transport assembly as in claim 1, wherein:

said guide means includes a card receiving means, said card receiving means including an asymmetrical slot.

3. A card reader and transport assembly as in claim 1, wherein:

said transport means further includes a motor; and, means mechanically coupling all of said card engaging means to said motor.

4. A card reader and transport assembly as in claim 1, wherein:

said plurality of rotatable card engaging members includes a first plurality of axel means each carrying a single wheel means; and, a second plurality of axel means, each carrying a plurality of wheel means.

5. A card reader and transport assembly as in claim 1, wherein:

said rotatable card engaging members are biased in a first direction, and said rotatable means is movable in a second direction perpendicular to said first direction.

6. A card reader and transport assembly as in claim 1, further comprising:

control means coupled to said transport means for controlling the operation thereof in response to the insertion of a card into said reader and transport assembly.

7. A card reader and transport assembly as in claim 1, further comprising:

read head mounting means for adjustably mounting said read head means.

8. A card reader and transport assembly as in claim 7, wherein:

said read head mounting means includes first means for rotating said read head about a first axis; and, second means for rotating said read head about an axis perpendicular to said first axis.

9. A card reader and transport assembly comprising:

read head means for detecting information stored on said card;

guide means for insuring that said card is properly oriented with respect to said read head means;

transport means for moving said card with respect to said read head means, said transport means including card engaging means for biasing at least a portion of said card into engagement with said read head means, said card engaging means including a plurality of rotatable card engaging members spaced along the direction of movement of said card, all of said rotatable card engaging members adapted to engage only a surface of said card facing away from said read head means, wherein said plurality of rotatable card engaging members includes a first plurality of axel means each carrying a single wheel means and, a second plurality of axel means, each carrying a plurality of wheel means;

rotatable means for simultaneously adjusting the biasing force exerted by all of said rotatable card engaging members in said rotatable card engaging means, rod means individually coupled to each of said axel means; and, frame means for supporting said rod means and all of said axel means, said frame means including a first plurality of channel portions oriented in a first direction for permitting movement of said axel means in said first direction, and a second plurality of channel means for permitting movement of said rod means in a direction perpendicular to said first direction.

* * * * *